United States Patent [19]

Moczygemba et al.

[11] 3,962,195

[45] June 8, 1976

[54] TERPOLYMERS OF A FURAN, A MALEIC ANHYDRIDE AND ONE OF A CONJUGATED DIENE AND A VINYL AROMATIC COMPOUND

[75] Inventors: George A. Moczygemba; Henry L. Hsieh, both of Bartlesville, Okla.

[73] Assignee: Phillips Petroleum Company, Bartlesville, Okla.

[22] Filed: June 11, 1973

[21] Appl. No.: 369,062

[52] U.S. Cl. ............................... 526/11.1; 526/272; 526/338; 526/340; 526/347
[51] Int. Cl.² ............... C08F 222/06; C08F 222/08; C08F 224/00
[58] Field of Search .................. 260/78.4 R, 78.5 BB

[56] References Cited
UNITED STATES PATENTS
2,811,512  10/1957  Austin ............................... 260/78.4
3,773,727  11/1973  Gaylord ........................ 260/78.5 BB OTHER PUBLICATIONS
Maleic Anhydride Derivatives; Flett et al., 1952.

N. G. Gaylord, Journal of Macro Molecular Sci.; A6, p. 1279 (1972).

*Primary Examiner*—John Kight, III

[57] ABSTRACT

A furan, a maleic anhydride and at least one unsaturated compound selected from a conjugated diene, e.g., butadiene and a vinyl aromatic, e.g., styrene are reacted in presence of a free-radical initiator, e.g., an organic peroxide or azo compound for example di-t-butyl peroxide or 2,2'-azobis(2-methylpropionitrile), in solution, e.g. in a hydrocarbon solution for example in toluene to produce a terpolymer. In one specific embodiment, furan, maleic anhydride and styrene and in another butadiene in lieu of the styrene are selected monomers. White powdery polymers are produced which can be converted to metal carboxylate salts. Additionally, the unsaturation in the polymer backbone permits crosslinking that is of value in the formation of protective coatings. Pendant anhydride groups are also crosslinking sites as by reaction with a diol.

11 Claims, No Drawings

TERPOLYMERS OF A FURAN, A MALEIC ANHYDRIDE AND ONE OF A CONJUGATED DIENE AND A VINYL AROMATIC COMPOUND

This invention relates to the production of a terpolymer and in one of its aspects the invention relates to the production of a terpolymer by interreacting in the presence of a free-radical initiator a furan, a maleic anhydride and at least one unsaturated compound selected from a conjugated diene and a vinyl aromatic. In a more specific aspect of the invention the furan, maleic anhydride and at least one of styrene and butadiene are copolymerized to form a terpolymer useful in the production of carboxylate salt and in the production of a crosslinked product.

In one of its concepts, this invention provides a terpolymer produced from a furan, a maleic anhydride and at least one material or compound selected from a vinyl aromatic and a conjugated diene. In another of its concepts, the invention provides a process for the production of a terpolymer as described employing a free-radical initiator, the polymerization being effected in a hydrocarbon solution. In a still further concept, the invention provides terpolymers as described and discloses their conversion to metal carboxylate salts. In still a further concept of the invention, terpolymers produced are converted by crosslinking to produce materials suited for compounding to produce films, casings, coatings and the like with or without the use of plasticizers, fillers and the like. In a still further concept, pendant anhydride groups are crosslinking sites and can be reacted with a diol to form crosslinked materials.

We have now conceived a new family of terpolymers as herein described and for conversions and uses as herein described.

An object of the invention is to produce a terpolymer. Another object of the invention is to produce a material useful as a parting aid. A further concept of the invention is to produce a material which can be crosslinked to produce a material suited for producing films, castings, etc. A further object of the invention is to produce a terpolymer from a furan, a maleic anhydride and at least one material selected from a conjugated diene and a vinyl aromatic.

Other aspects, concepts, objects and the several advantages of the invention are apparent from a study of this disclosure and the appended claims.

According to this invention, a furan, a maleic anhydride and at least one of a conjugated diene and a vinyl aromatic are copolymerized or interpolymerized in the presence of a free radical initiator to produce a terpolymer. Still according to the invention, the process is conducted in a hydrocarbon solution. Still further according to the invention, the terpolymer is converted to a carboxylate salt or can be crosslinked through the pendant anhydride groups as by reaction with a diol or otherwise crosslinked through the unsaturation in the polymer backbone by known crosslinking agents, e.g., sulfur, peroxides and the like.

MONOMERS

Furan

Furan and substituted furans which can be used in the invention can be represented by the following formula:

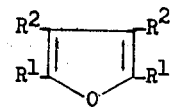

wherein, $R^1$ is hydrogen, halogen, or a lower alkyl group such as methyl or ethyl and $R^2$ is hydrogen, halogen, or hydrocarbyl such as alkyl, cycloalkyl, aryl, or combinations thereof such as alkaryl, aralkyl and the like such that the total number of carbon atoms in all of the R groups does not exceed about 20. Examples of such compounds include furan, 3-methylfuran, 2,5-difluorofuran, 2-fluoro-3,4-di-n-butylfuran, 3-cyclohexylfuran, 2-ethyl-3-phenylfuran, 2,5-dimethyl-3(4-methylphenyl)furan, 3-n-dodecylfuran, 3-benzylfuran, 2,5-diethyl-3,4-di-(2-ethylhexyl)furan and the like.

Maleic Anhydride and Related Compounds

Maleic anhydride and substituted maleic anhydrides can be employed and can be represented by the following formula:

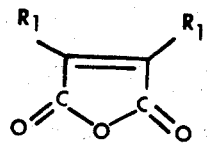

wherein the $R_1$ groups are as defined.

It is preferred, in order to facilitate polymerization, that less substituted furans be used. The highly substituted furans are not now preferred as a comonomer with a substituted maleic anhydride when higher polymerization rates and higher molecular weights are desired. Thus, higher rates and higher molecular weights are obtained more readily in polymerizations in which bulky substituents do not appear in both of these comonomers. Suitable examples include maleic anhydride, methylmaleic anhydride, dimethylmaleic anhydride, fluoromaleic anhydride, methylethylmaleic anhydride and the like.

Conjugated Dienes

Conjugated dienes suitable for use in this invention ordinarily will contain from 4 to about 12 carbon atoms per molecule, preferably from 4 to about 8 carbon atoms. Examples of such compounds include 1,3-butadiene, isoprene, 2,3-dimethyl-1,3-butadiene, piperylene, 3-butyl-1,3-octadiene, and the like.

Vinyl Aromatic Compounds

The vinyl aromatic compounds include styrene, 1-vinylnaphthalene, 2-vinylnaphthalene and the alkyl, cycloalkyl, and halo derivatives thereof in which the total number of carbon atoms in the combined substituents is generally not greater than about 12. Examples of such substituted vinyl aromatics include 3-methylstyrene, 4-n-propylstyrene, 4-cyclohexylstyrene, 4-dodecylstyrene, 2-ethyl-4-benzylstyrene, 4-(4-phenyl-n-butyl)styrene, 2,3-dichlorostyrene, 4-fluorostyrene and the like.

Monomer Ratios

The following are on a molar basis.

| Range | Furan | Maleic Anhydride | Styrene or Butadiene |
| --- | --- | --- | --- |
| Broad | 10–0.1 | 1 | 10–0.1 |
| Preferred | 2–0.2 | 1 | 2–0.2 |
| Most Preferred | 2–0.2 | 1 | 0.9–0.2 |

INITIATORS

Initiators useful in the invention include the monomer-soluble organic peroxy compounds, such as peroxides, hydroperoxides and peresters and the azo compounds, e.g., di-t-butyl peroxide, benzoyl peroxide, lauroyl peroxide, t-butyl peracetate, t-butyl perbenzoate, dicumyl peroxide, t-butyl peroxide, 2,5-dimethyl-2,5-di(t-butylperoxy)hexane, 2,5-dimethyl-2,5-di(t-butylperoxy)hexyne-3, t-butylhydroperoxide, cumene hydroperoxide, p-menthane hydroperoxide, cyclopentane hydroperoxide, diisopropyl benzene hydroperoxide, pinene hydroperoxide, and the like, and mixtures thereof, as well as azo initiators such as 2,2'-azobis(2-methylpropionitrile), and the like. Alternative free radical sources can also be employed.

Employing the preferred source of free radicals, i.e. peroxy or azo compounds, the quantity of initiator can vary broadly from about 0.1 to about 10 or preferably from 0.5 to about 3 weight percent of the combined weight of the monomers.

OPERATING CONDITIONS

Suitable approximate polymerization temperature ranges, degrees C are:

| | |
| --- | --- |
| Broad | 0 – 200 |
| Preferred | 25 – 150 |

Ranges of approximate polymerizations times are:

| | |
| --- | --- |
| Broad | A few minutes to 48 hours |
| Preferred | 5 hours to 30 hours |

The polymerization reaction can be carried out under autogeneous pressure or at any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by some such suitable method as the pressurization of the reactor with a gas which is inert with respect to the polymerization reaction.

The process can be carried out under continuous conditions or batch conditions. To obtain efficient reaction, oxygen and other substances known to be detrimental to free radical processes are to be excluded from the reaction zone for best results.

The process of this invention can be carried out in an excess of furan or the substituted furan whereby said furan functions as both reactant and as solvent. The excess furan promotes the polymerization reaction without increasing the furan content of the resulting terpolymer. However, suitable inert solvents or diluents or combinations thereof can be employed as the polymerization medium. Although any such solvent or diluent can be employed, the aromatic hydrocarbons such as benzene, toluene, the xylenes, and the like are preferred. Among the other suitable solvents and diluents are non-hydrocarbon compounds which do not contain reactive hydrogen atoms such as do alcohols, mercaptans, and amines. Suitable, polar, nonhydrocarbon solvents include ketones, esters, and ethers as for example acetone, ethyl acetate, dibutyl ether, and the like. Solvents can be selected by routine testing.

The butadiene-containing terpolymers are less soluble in the polymerization solvents than the styrene-containing terpolymers. The less soluble terpolymers, especially if prepared in a hydrocarbon solvent, tend to precipitate upon formation. An antioxidant, e.g. 2,6-di-t-butyl-4-methylphenol, can be added, with agitation, during or at the conclusion of the polymerization. If the polymer produced is insoluble in the polymerization solvent, it can be isolated by filtration, decantation, centrifugation, or the like, washed with additional solvent, and dried. If the polymer produced is soluble in the polymerization solvent, the polymer can be isolated by addition to the product mixture of a substance in which the polymer is not soluble, e.g. n-heptane, to cause precipitation. The polymer can then be isolated as above described. It will be further understood that the exact method or recovering the terpolymers from the product mixture is not a critical feature of this invention, and that an appropriate choice from among the known procedures can be readily made by one with ordinary skill in the art.

POLYMER PROPERTIES

NMR spectral analysis of the product of Example 6 (shown below) indicated that furan, maleic anhydride and styrene were present as a terpolymer, that blockiness appeared absent [i.e. there was no, e.g., $(styrene)_x$ type structure present], that furan was polymerized through the 2,5-positions, and that the monomers were present in random rather than ordered distribution. Since conversion values were high, it is apparent that each monomer was well represented in the terpolymers. These facts coupled with the occurrence of peak conversions among Experiments 1–6 (shown below) at the mole ratio of 1 furan: 2 maleic anhydride: 1 styrene in view of the known difficulty of either furan or maleic anhydride to homopolymerize, appear to strongly suggest a preferred terpolymer composition of 1 furan: 2 maleic anhydride: 1 styrene arranged in an average structure which can be described as:

-furan-maleic anhydride-styrene-maleic anhydride-

Analogous relations are believed to hold for the furan-maleic anhydride-butadiene terpolymer.

The polymers of the instant invention can be made into films and castings with property variations governed by incorporation of plasticizers, fillers and the like. Also, the polymers can be converted to useful derivatives. For example, metal carboxylate salts derived from the anhydride groups can be formed. The carbon-carbon double bonds in the polymer backbone make crosslinking possible, a reaction of value in preparing protective coatings. The pendant anhydride groups also offer crosslinking potential by reaction with a diol. Conversion of said anhydride groups to esters, acid halides, amides and the like afford a wide range of product possibilities.

PROCEDURE

The polymerizations were carried out under nitrogen in capped beverage bottles employing anhydrous reactants and conditions. The solvent and initiator were added under nitrogen prior to capping, the bottles were capped with perforated bottle caps containing liners to permit introduction by hypodermic techniques of fluids to the capped bottles, purged by nitrogen of any included air, the monomers were added and the bottles were tumbled in a constant temperature both at the stipulated conditions of time and temperature. The polymers precipitated upon formation, were collected by filtration, washed with additional polymerization solvent and were dried under reduced pressure. Handling and storage of the polymers are advisably carried out under nitrogen or other inert atmosphere in view of the presence of the anhydride groups in the polymers.

Abbreviations employed below are:

| Cmpd | compound |
|---|---|
| Azo | 2,2'-azobis(2-methylpropionitrile) |
| $Bz_2O$ | benzoyl peroxide |
| Bd | butadiene |
| Sty | styrene |
| I.V. | inherent viscosity, determined in tetrahydrofuran by essentially the process shown in U.S. Pat. No. 3,278,508 col. 20, note a. |

EXAMPLE I

Terpolymers of furan, maleic anhydride, and styrene were prepared in accordance with the following tabulation. The polymerizations were carried out in toluene (100 ml.) at 70°C for 20 hours.

Reasonable variation and modification are possible in the scope of the foregoing disclosure and the appended claims to the invention the essence of which is that a furan, a maleic anhydride and at least one unsaturated compound selected from a conjugated diene and a vinyl aromatic have been interacted or copolymerized as described to form terpolymers also as described, the terpolymers being useful as such or in a converted stage also as described.

We claim:

1. A process for producing a novel terpolymer which comprises interreacting in the presence of a free-radical initiator: (1) a furan having the formula:

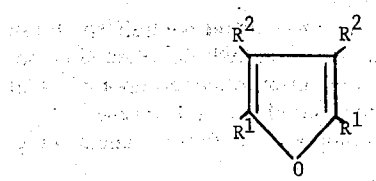

wherein $R^1$ is hydrogen, halogen, or a lower alkyl group such as methyl or ethyl and $R^2$ is hydrogen, halogen, or hydrocarbyl such as alkyl, cycloalkyl, aryl, or combinations thereof such as alkaryl, aralkyl and the like such that the total number of carbon atoms in all of the R groups does not exceed about 20; (2) a maleic anhydride and (3) at least one unsaturated compound selected from a conjugated diene and a vinyl aromatic, said interreacting under conditions suitable for terpolymerization comprising a pressure sufficient to maintain the reaction mixture substantially in the liquid phase and a ratio of said furan:maleic anhydride:unsaturated compound in the range of about 10 to 0.1:1:10 to 0.1.

2. A process according to claim 1 wherein the maleic anhydride can be represented by the following formula:

| Run No. | Furan | | Maleic Anhyd. | | Styrene | | Mole Ratio | $Bz_2O$ | Yield | | I.V. |
|---|---|---|---|---|---|---|---|---|---|---|---|
| | g | mole | g | mole | g | mole | F:MA:Sty | g | g | Percent of Theory | |
| 1 | 3.2 | 0.047 | 9.2 | 0.094 | 4.9 | 0.047 | 1:2:1 | 0.174 | 15.5 | 89.6 | 0.31 |
| 2 | 4.7 | 0.069 | 6.8 | 0.069 | 3.6 | 0.035 | 2:2:1 | 0.132 | 13.0 | 86.2 | 0.28 |
| 3 | 2.2 | 0.032 | 6.3 | 0.064 | 6.7 | 0.064 | 1:2:2 | 0.158 | 12.8 | 81.6 | 0.54 |
| 4 | 6.1 | 0.090 | 8.8 | 0.090 | 9.3 | 0.089 | 1:1:1 | 0.246 | 17.4 | 70.8 | 0.44 |
| 5[a] | 9.0 | 0.132 | 13.0 | 0.133 | 7.0 | 0.067 | 2:2:1 | 0.87 | 24.8 | 85.5 | —[b] |
| 6 | 2.2 | 0.032 | 6.3 | 0.064 | 3.35 | 0.033 | 1:2:1 | 0.236 | 11.4 | 95.9 | 0.27 |

[a]Example 5 is essentially a double scale duplicate of Example 2.
[b]Not determined.

As noted above, the highest conversions occur at a monomer charge of 1 furan : 2 maleic anhydride : 1 styrene. Example 6 shows, logically, an increase in initiator level promotes conversion. The products were white powdery solids.

EXAMPLE II

Terpolymers of furan, maleic anhydride, and butadiene and of furan, maleic anhydride and styrene were prepared in accordance with the following tabulation. The polymerizations were each carried out in toluene (100 ml.) at 70°C for 20 hours.

| Run No. | Furan | | Maleic Anhyd. | | Third Monomer | | | Initiator | | Yield | |
|---|---|---|---|---|---|---|---|---|---|---|---|
| | g | mole | g | mole | Cmpd. | g | mole | Cmpd. | g | g | Percent of theory |
| 7 | 2.9 | 0.042 | 8.2 | 0.082 | Bd | 2.3 | 0.042 | Azo | 0.268 | 12.4 | 93 |
| 8 | 3.0 | 0.044 | 8.7 | 0.089 | Bd | 2.4 | 0.044 | $BzO_2$ | 0.282 | 12.9 | 92 |
| 9 | 3.5 | 0.052 | 9.9 | 0.101 | Sty | 5.3 | 0.051 | Azo | 0.374 | 19.0 | 100 |
| 10 | 3.5 | 0.052 | 10.0 | 0.102 | Sty | 5.3 | 0.051 | $BzO_2$ | 0.376 | 19.5 | 100 |

The polymers were white powders. The styrene-containing polymer was soluble in acetone and tetrahydrofuran whereas the butadiene-containing polymer was not. These Examples illustrate the use of monomer ratios of 1:2:1 furan:maleic anhydride:butadiene or styrene and show good yields of terpolymer.

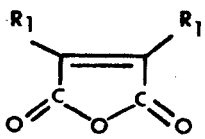

wherein the $R_1$ groups are hydrogen, halogen, or lower alkyl groups such as methyl or ethyl; the conjugated diene is at least one containing 4 to about 12 carbon atoms per molecule; and the vinyl aromatic compound is at least one containing no more than about 12 carbon atoms to the molecule.

3. A process according to claim 1 wherein the furan selected is furan, the maleic anhydride selected is maleic anhydride and the unsaturated compound is at least one selected from butadiene and styrene.

4. A terpolymer composed of furan, maleic anhydride and styrene.

5. A terpolymer composed of furan, maleic anhydride and butadiene.

6. A process according to claim 1 wherein a terpolymer of furan, maleic anhydride and one of butadiene and styrene is prepared in the presence of a solvent and initiator in an atmosphere excluding air.

7. A process according to claim 2 for producing a novel terpolymer wherein the interreacting takes place at a temperature in the range of 0 to about 200°C, and for a time within the range of a few minutes to 48 hours.

8. A process according to claim 7 wherein the furan selected is furan, the maleic anhydride is maleic anhydride, and the unsaturated compound is at least one selected from butadiene and styrene.

9. A process according to claim 7 wherein a terpolymer of furan, maleic anhydride and one of butadiene and styrene is prepared in the presence of a solvent and initiator in an atmosphere excluding air.

10. A terpolymer composed of furan, maleic anhydride and styrene prepared by the method of claim 7.

11. A terpolymer composed of furan, maleic anhydride and butadiene prepared by the method of claim 7.

* * * * *